United States Patent
Futterer

[15] 3,694,684
[45] Sept. 26, 1972

[54] CYLINDRICAL COIL WINDING FOR AN ELECTRICAL MACHINE

[72] Inventor: Bodo Futterer, Schonbuhlring 37, Luzern, Switzerland

[22] Filed: March 26, 1971

[21] Appl. No.: 128,456

Related U.S. Application Data

[63] Continuation-in-part of Ser. No. 760,009, Sept. 16, 1968, abandoned.

[52] U.S. Cl....................................310/198, 310/45
[51] Int. Cl.................................................H02k 3/00
[58] Field of Search..........310/266, 195, 43, 45, 184, 310/195, 202, 198, 203, 205; 29/605, 598

[56] References Cited

UNITED STATES PATENTS

| | | | |
|---|---|---|---|
| 3,360,668 | 12/1967 | Faulhaber | 310/195 |
| 3,442,702 | 5/1969 | Pendleton | 29/605 |
| 3,441,761 | 4/1969 | Painton | 29/598 |
| 3,344,514 | 10/1967 | Partlow | 29/598 |
| 3,488,837 | 1/1970 | Massouda | 310/266 |

FOREIGN PATENTS OR APPLICATIONS

| | | | |
|---|---|---|---|
| 11,188 | 4/1846 | Great Britain | 310/195 |
| 963,081 | 5/1957 | Germany | 310/195 |
| 545,345 | 10/1922 | France | 310/266 |

*Primary Examiner*—J. D. Miller
*Assistant Examiner*—R. Skudy
*Attorney*—Arthur Schwartz

[57] ABSTRACT

A cylindrical coil for an electrical machine having a plurality of turns wherein each turn overlaps a plurality of adjacent turns and a portion of each turn lies in a first cylindrical layer and the remaining portion of each turn lies in a second cylindrical layer. The wire turns have a rhomboidal contour.

5 Claims, 5 Drawing Figures

PATENTED SEP 26 1972  3,694,684

INVENTOR
BODO FUTTERER

BY Arthur Schwarz
ATTORNEY

CYLINDRICAL COIL WINDING FOR AN ELECTRICAL MACHINE

CROSS-REFERENCE

The application is a continuation in part of the copending application entitled "cylindrical coil winding for an electrical machine of the same inventor," filed Sept. 16, 1968, Ser. No. 760,009, now abandoned.

BACKGROUND & OBJECTS

This invention concerns a cylindrical coil winding for an electrical machine, and more particularly for a small direct current motor or direct current generator.

Such a cylindrical coil is needed when the lowest possible inertia of a rotor is desired. In addition, the specific form of a cylindrical coil makes it possible to avoid the use of winding slots and thus to achieve usually high degrees of efficiency with small direct current machines. Hitherto cylindrical coils have been used the turns of which are formed hexagonal, since it was felt to be advantageous to use windings having relatively long portions coaxial to the axis of the armature. The reason for this is that a greater mechanical force or momentum is exerted on a unit of length of a hexagonal winding. The maximum performance of such a armature would be achieved if the portions of the windings coaxial to the axis of the armature extended over the entire axial length of the armature or the magnetic field, as the case may be; whereas the connection portions of the windings would be straight and orthogonal to the axial portions. This would lead to rectangular windings. However, although such a form of the winding is quite common in armatures having iron cores, such a construction is not feasible in armatures of the type with which the instant invention is concerned since the winding heads of the armature coil, i.e., those portions which are orthogonal to the axis of the armature would be too thick. Therefore, a hexagonal shape of the windings has been used in the past since they form the best approximation to rectangular windings.

It is an object of the invention to provide a cylindrical coil which has a greater mechanical rigidity than the known windings and yet has an equivalent electrical efficiency.

It is another object of the invention to provide a cylindrical coil for the armature of electrical machines which is self-supported and which may be used for high rotational speeds.

Still another object of the invention is a cylindrical coil formed of rhomboidal turns of a thin wire in a multi-layer configuration.

A further object of the invention is the provision of a cylindrical coil in which the turns are arranged in a contiguous relationship over almost its entire length.

SUMMARY OF THE INVENTION

According to the invention a cylindrical coil is formed of rhomboidal turns of a single wire which are arranged in a fish-scale like relationship.

According to one embodiment an enamelled wire is used which is provided with a thermo-setting lacquer or an adhesive.

According to a further feature of the invention the turns have the form of an oblique rhomboid.

Still other features will reside from the following description.

BRIEF DESCRIPTION OF THE DRAWINGS

The invention will be described in greater detail hereinafter with reference to an embodiment illustrated in the accompanying drawings in which.

DETAILED DESCRIPTION OF THE INVENTION

Figure 1:
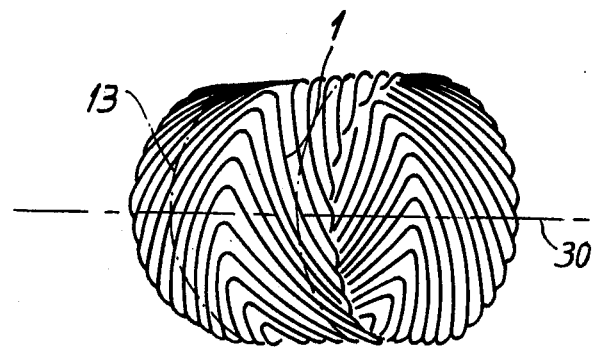
FIG. 1 is a perspective view of a cylindrical coil.
Figure 4:
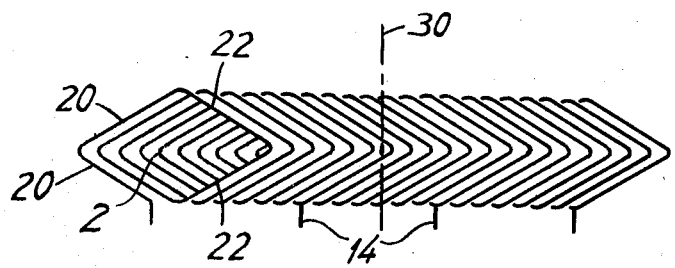
FIG. 4 is a plan view of a flattened portion of the coil shown in FIG. 1.

According to FIG. 1 the cylindrical coil of the present invention is formed of rhomboidal turns 1, which are arranged in a fish-scale like relationship and bent to a cylindrical form, i.e., the turns are overlapped and part of each turn 20 is lying in one definite cylindrical layer, wherein the remaining part of said turn 22 is lying in another distinct layer. Thus, the coil shown in FIG. 1 has a thickness which is approximately double the thickness of the wire. It may be seen from FIG. 1 that the edges of the turns 1 have no portions which are parallel to the axis of the coil and that the turns are bent at the side faces of the coil and in the middle of its length. FIG. 4, which shows the flattened coil makes clear that the portions of the turns in said one layer overlie the portions of the turns in the other layer in a cross-over relationship. The flattened coil shown in FIG. 4 is bent into a cylindrical shape about the axis 30. Thus, the coil has a great mechanical rigidity. Merely the small curved or bent portions 2 of the turns which are curved with a small radius do not lie in a cross-over relationship over its entire length. However, this is not detrimental to mechanical rigidity since these curved portions are of a dimension in the order of the thickness of the wire. FIG. 4 also shows a pole piece 35 which has substantially the same shape as the rhomboidal contour of a turn of wire.

Figure 5:
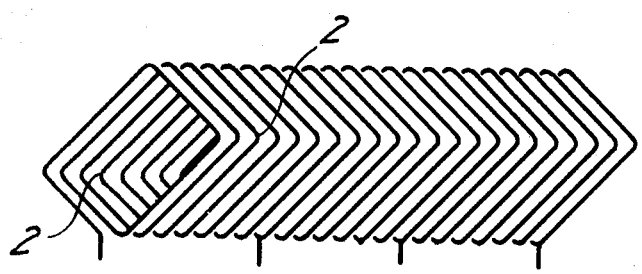
FIG. 5 is a plan view of a flattened portion of a coil similar to that shown in FIG. 1, but having turns formed like oblique rhomboids.

FIG. 5 shows another embodiment of a cylindrical coil according to the invention in which the turns have the form of oblique rhomboids, i.e., contiguous straight portions of each turn are unequal in length. Such a construction further increases mechanical rigidity since the curved or bent portions 2 in the one layer are displaced with respect to the bent portions in the other layer.

Figure 2:
FIG. 2 is a side view of part of the coil of FIG. 1.

FIG. 2, which is a side view of an edge portion of the cylindrical coil shows that the edges 3 of each turn lie obliquely to a radial direction. It is these edges where the wire of each turn changes from one layer to the other. It is advantageous to form the cylindrical coil using a thermosetting lacquer and to press the coil to a minimum thickness in order to reduce the necessary thickness of the air gap of the electrical machine, in which the cylindrical coil is to be mounted. However, since the edges of a coil are rather sensitive to damage it may be advisable to make the cylindrical coil longer than the air gap of the electrical machine and to press only an intermediate portion of length of the coil.

Figure 3:
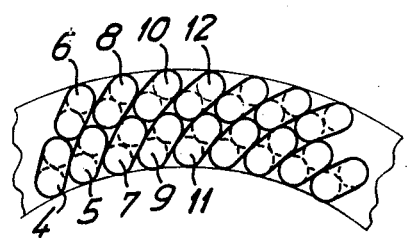
FIG. 3 is a side view of part of a coil similar to that in FIG. 1, but having the turns arranged in a multi-layer configuration.

FIG. 3 is a side view of part of another cylindrical coil according to the invention in which the turns are arranged in more than two layers. It may be seen from FIG. 3 that successive turns are arranged in a pilgrim's step-like manner. Successive turns are denominated with reference numerals 4,5,6,7,8,9,10,11, and 12.

In order to increase the maximum permissible speed of a cylindrical coil the outer surface of the same may be provided with a foil 13, as is shown in dotted lines in FIG. 1. Said foil is preferably made of a plastic material. f.i. polyethylene and extends around the whole circumference of the coil.

Although it is preperable to have successive turns of a coil adjacent each other it is within the scope of the invention if they are arranged irregularly.

The optimum electrical performance of a cylindrical coil according to the invention will be achieved if the axial length of a turn is 1,4 fold the width of the same.

Although the cylindrical coil is self-supported a special cylindrical support, preferable of an insulating material, or of a ferromagnetic material may be fixed to at least one surface of the coil. Alternately, a supporting foil may be provided between two cylindrical layers of the coil.

I claim:

1. A cylindrical coil for an electrical machine comprising: a plurality of turns, each turn overlapping a plurality of adjacent turns; a portion of each turn lying in a first cylindrical layer, and substantially all of the remaining portions of each of said turns lying in a second cylindrical layer; each of said turns forming a substantially closed, flattened winding pattern of a dual layer cylinder; and the turns of the peripheral portions thereof being of rhomboidal contour.

2. A cylindrical coil according to claim 1, wherein all turns are made of a single wire and wherein taps are provided at one circumferential edge of the coil.

3. A cylindrical coil according to claim 1, wherein the turns are made of an enamelled wire which is coated with a thermo-setting laquer.

4. A cylindrical coil according to claim 1, wherein a support is fixed to at least one surface of the coil.

5. A cylindrical coil according to claim 1, wherein a supporting foil is provided between at least two cylindrical layers of the coil.

* * * * *